(12) United States Patent
Sennett et al.

(10) Patent No.: US 8,155,628 B1
(45) Date of Patent: Apr. 10, 2012

(54) MOBILE INITIATED BROADCAST

(75) Inventors: DeWayne Allan Sennett, Redmond, WA (US); Brian Kevin Daly, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 915 days.

(21) Appl. No.: 11/532,201

(22) Filed: Sep. 15, 2006

(51) Int. Cl.
*H04M 3/42* (2006.01)
(52) U.S. Cl. ............... 455/414.1; 455/414.2; 455/414.3; 455/414.4; 455/435.1; 455/435.2; 455/567; 455/466; 455/418; 455/419; 455/420; 709/217; 709/218; 709/219
(58) Field of Classification Search .... 455/414.1–414.4, 455/567, 466, 418–420, 435.1, 435.2; 709/217–219
See application file for complete search history.

(56) References Cited

U.S. PATENT DOCUMENTS

| 7,349,711 B2* | 3/2008 | Hu et al. ....................... 455/519 |
| 7,558,587 B2* | 7/2009 | Albal et al. ................... 455/509 |
| 2003/0064706 A1* | 4/2003 | Ala-Luukko et al. ......... 455/412 |
| 2004/0127200 A1* | 7/2004 | Shaw et al. ................. 455/414.1 |
| 2005/0207415 A1* | 9/2005 | Curcio et al. ................. 370/390 |
| 2006/0019690 A1* | 1/2006 | Zufall ........................... 455/518 |
| 2006/0094360 A1* | 5/2006 | Jung et al. .................... 455/41.2 |
| 2006/0094414 A1* | 5/2006 | Miyake et al. ............... 455/418 |
| 2006/0136340 A1* | 6/2006 | Park ............................... 705/52 |
| 2007/0180486 A1* | 8/2007 | Yoon ............................ 725/115 |
| 2007/0239867 A1* | 10/2007 | Belimpasakis et al. ....... 709/224 |

* cited by examiner

*Primary Examiner* — Rafael Pérez-Gutiérrez
*Assistant Examiner* — Lameka J. Kirk
(74) *Attorney, Agent, or Firm* — Woodcock Washburn LLP

(57) ABSTRACT

Multimedia content is broadcast from a mobile device. The multimedia content, or a portion thereof, can be downloaded to or generated by the mobile device. The mobile device can comprise a cellular phone, camera phone, video phone, PDA, or the like, capable of transmitting multimedia content. The multimedia content can include images, video, audio and/or sensor content. The multimedia content is transmitted to a broadcast server via a radio network for subsequent broadcast to intended recipients. For example a first responder at a disaster site can broadcast multimedia, via a mobile device, to other first responders, to an Incident Commander on the site, and/or to remote recipients such as city, county, and/or state Emergency Operations Centers. The multimedia content can be broadcast via a wireless broadcast network, an intranet, the Internet, or a combination thereof.

12 Claims, 5 Drawing Sheets

MOBILE INITIATED BROADCAST

TECHNICAL FIELD

The technical field generally relates to communications systems and more specifically relates to initiating a broadcast from a mobile device.

BACKGROUND

Technologies have been defined which support the distribution of multimedia content to wireless and wired devices. These technologies, however, assume that the multimedia content is being generated by a third party service provider (e.g., a corporation, a news organization). Existing wireless applications such as, video sharing or the like, distribute multimedia content on a point to point basis only. Existing wireless applications do not broadcast multimedia content.

SUMMARY

Multimedia content is broadcast from a mobile device. The mobile device can comprise a cellular phone, camera phone, video phone, PDA, or the like, capable of transmitting multimedia content. In an example embodiment, the mobile device is a wireless device capable of transmitting multimedia content wirelessly. The multimedia content can include images, video, and/or audio content. In an example embodiment, multimedia content is provided to the mobile device via download to the mobile device, via generation of the multimedia content by the mobile device, or a combination thereof. Intended recipients of the multimedia content and the connectivity type to be used to broadcast the multimedia content to the intended recipients are determined. The multimedia content is broadcast via a wireless broadcast network, an intranet, the internet, or a combination thereof, to the intended recipients in accordance with the connectivity type associated with the respective intended recipient.

BRIEF DESCRIPTION OF THE DRAWINGS

The foregoing summary, as well as the following detailed description, is better understood when read in conjunction with the appended drawings.

DETAILED DESCRIPTION OF ILLUSTRATIVE EMBODIMENTS

Broadcasting multimedia content, such as a picture, video, and/or audio, can be advantageous in various situations. For example, a user of a mobile device, such as a camera phone, could broadcast multimedia content depicting a disaster site. The multimedia could be broadcast to several other mobile devices, to a geographic area, to selected cell sites, or a combination thereof, for example. In accordance with this example, real-time multimedia content could be sent from a first responder at the disaster site to other first responders, to the Incident Commander on the site, and/or to remote recipients such as city, county, and/or state Emergency Operations Centers.

Figure 1:
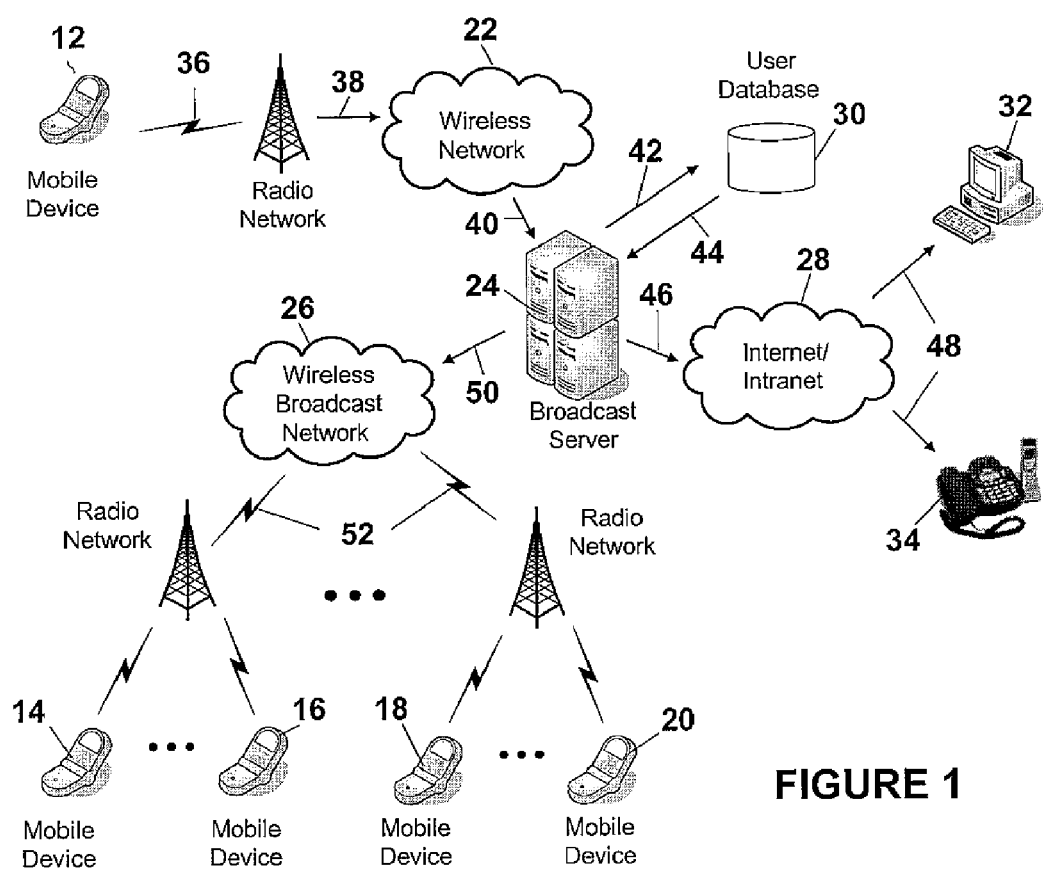
FIG. 1 is a flow diagram of an example process and system for broadcasting multimedia content from a mobile device.

FIG. 1 is a flow diagram of an example process and system for broadcasting multimedia content from a mobile device. At step 36, a mobile device 12 provides multimedia content for broadcast to a radio network. In an example embodiment, the multimedia content is provided over, as known in the art, an established Internet Protocol (IP) data session. A mobile device (e.g., mobile devices 12, 14, 16, 18, 20) can comprise any appropriate mobile device, such as, for example, a portable device, a variety of computing devices including (a) a portable media player, e.g., a portable music player, such as an MP3 player, a walkmans, etc., (b) a portable computing device, such as a laptop, a personal digital assistant ("PDA"), a portable phone, such as a cell phone of the like, a smart phone, a Session Initiation Protocol (SIP) phone, a video phone, a portable email device, a thin client, a portable gaming device, etc., (c) consumer electronic devices, such as TVs, DVD players, set top boxes, monitors, displays, etc., (d) a public computing device, such as a kiosk, an in-store music sampling device, an automated teller machine (ATM), a cash register, etc., (e) a navigation device whether portable or installed in-vehicle and/or (f) a non-conventional computing device, such as a kitchen appliance, a motor vehicle control (e.g., steering wheel), etc., or a combination thereof.

The multimedia content provided by the mobile device 12 can comprise any appropriate multimedia content, such as for example, multimedia previously stored (canned) in the mobile device 12, multimedia content downloaded to the mobile device 12 (e.g., from the Internet, from an intranet, from another mobile device), multimedia content being generated by the mobile device and being stored in the mobile device, multimedia provided to the mobile device 12 via a Personal Area Network (PAN) such as Bluetooth, and/or multimedia content being generated in real-time by the mobile device 12 utilizing for example, a camera, a video sensor, and/or a audio sensor (e.g., microphone). Multimedia content can include, for example, graphic content (e.g., a picture), video content, audio content, HTML content, sensor content (e.g., seismographic content), or a combination thereof.

As described throughout, multimedia can be provided in any appropriate manner. For example, multimedia can be provided wirelessly or by wire, multimedia can be provided via electromagnetic means such as Radio Frequency (RF) means and/or optical means, multimedia content can be formatted, modulated, demodulated, digitized, in analog form, discretized, or any appropriate combination thereof.

At step 38, the radio network provides the received multimedia content to a wireless network 22. The wireless network 22 provides, at step 40, the multimedia content to a broadcast server 24. In various example embodiments, upon receiving the multimedia content, the broadcast server stores the multimedia content for subsequent provision, provide the multimedia content in real-time, or a combination thereof.

At step 42, the broadcast server 24 provides a query to a user database 30. In an example embodiment, the broadcast server 24 provides a query (step 42) to the user database 30 in real-time (i.e., as soon as practicable upon receipt of the multimedia from the wireless network 22). In another example embodiment, the broadcast server 24 stores the multimedia content received from the wireless network 22 and subsequently provides the query upon request. The request can be provided from any appropriate source, such as a mobile device, a network, or a database, for example. The broadcast server 24 queries (at step 42) the user database 30 for users who should receive the multimedia content that was provided by the mobile device 12. In an example embodiment, the broadcast server also queries (at step 42) the user database 30 as to connectivity to utilize, such as a wireless broadcast network, the internet, an intranet, or the like.

The user database 30 can comprise any appropriate processor/storage means. In an example embodiment, the user database 30 is preconfigured to identify intended recipients of the multimedia content. The intended recipients can include subscribers who wish to receive broadcasts of multimedia content. Subscribers can be stored in the user database 30 via a system administrator, via self-subscription over the internet or an intranet, or by any appropriate means. Each intended recipient has associated therewith, the type of connectivity to utilize for a respective intended recipient. In an example embodiment, the user database 30 comprises a list, or table, of intended recipients and the type of connectivity (e.g., wireless broadcast network, internet, intranet) to utilize for each intended recipient. In various embodiments, an intended recipient can have associated therewith more than one type of connectivity to be utilized to broadcast multimedia content. For example, an intended recipient may have subscribed to receive multimedia content via the internet and via a broadcast network.

The user database 30 responds, at step 44, to the broadcast server's query (at step 42). The response comprises the intended recipients of the multimedia content. In an example embodiment, the response comprises the connectivity type(s) associated with each intended recipient provided in the response. In an example embodiment, the response comprises a list, or table, of intended recipients and the type of connectivity (e.g., wireless broadcast network, internet, intranet) to utilize for each intended recipient.

At step 46, the broadcast server 24 provides the multimedia content to the internet and/or intranet 28. The internet and intranet are depicted in FIG. 1 as a single entity 28 for the sake of simplicity. As known in the art, the internet and an intranet can comprise separate networks. The multimedia content is provided to the internet or an intranet, at step 46, if intended recipients received (at step 44) by the broadcast server have associated therewith a connectivity type of the internet or an intranet, respectively. In an example embodiment, the multimedia is provided to the internet/intranet 28, at step 46, if an intended recipient is connected to the internet/intranet 28 and has associated therewith a connectivity type of the internet or an intranet, respectively.

At step 48, the internet/intranet 28 provides the multimedia content to respective devices 32 and 34. Devices 32 and 34 represent appropriate devices for receiving the multimedia content. The number of devices need not be limited to two, as depicted by devices 32 and 34, but rather, any number of devices (or a single device) is appropriate. The devices 32, 34 can comprise any appropriate device capable of receiving multimedia content. Example appropriate devices include a personal computer (PC), a PDA, a smart phone, a Session Initiation Protocol (SIP) phone, a video phone, or the like. The devices 32, 34 can be connected to the internet/intranet 28 via any appropriate means having sufficient bandwidth to provide the multimedia content. The devices 32, 34 can be connected to the internet/intranet 28 via wireless means and/or wired means. In an example embodiment, the internet/intranet 28 provides the multimedia content via an IP data session.

At step 50, the broadcast server 24 provides the multimedia content to the wireless broadcast network 26. The multimedia content is provided to the wireless broadcast network 26, at step 50, if intended recipients received (at step 44) by the broadcast server 24 have associated therewith a connectivity type of wireless broadcast network, or the like. In an example embodiment, step 50 occurs concurrently with, or approximately concurrently with, step 46. That is, the transmission start time of step 50 is approximately the same transmission start time of step 46, or as close to the same time as is reasonably practicable. In an example embodiment, the broadcast server 24 provides the multimedia content to the wireless broadcast network 26 in real time. That is, rather than store the multimedia content in the broadcast server 24 until a request for the multimedia content is received by the broadcast server 24, the broadcast server 24 provides the multimedia content to the wireless broadcast network 26 upon receipt thereof or as close to receipt thereof as reasonably practicable.

At step 52, the wireless broadcast network 26 provides the multimedia content to respective devices 14, 16, 18, 20, via the appropriate radio network. Devices 14, 16, 18, 20 represent appropriate devices for receiving the multimedia content. The number of devices need not be limited to any specific amount, but rather, any number of devices (or a single device) is appropriate. The devices 14, 16, 18, 20 can comprise any appropriate device capable of receiving the broadcast of multimedia content. Example appropriate devices include a personal computer (PC), a PDA, a smart phone, a Session Initiation Protocol (SIP) phone, a video phone, or the like.

The wireless broadcast network 26, as described in more detail below, can comprise any appropriate wireless broadcast network, such as Cell Broadcast, Multimedia Broadcast/Multicast Service (MBMS), WiFi, Worldwide Interoperability for Microwave Access (WiMAX), MEDIAFLO™, Digital Video broadcast-Handheld ("DVB-H"), IP Multicast, or the like.

Figure 2:
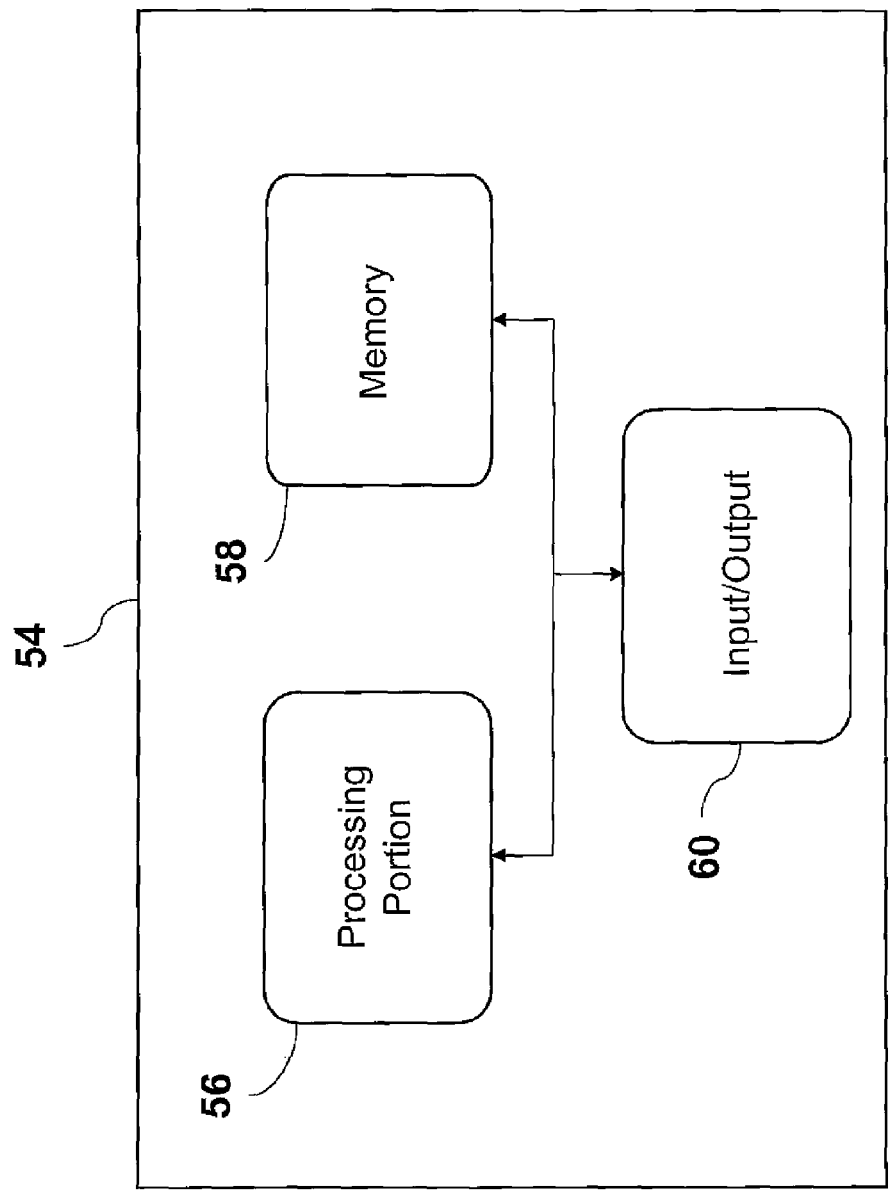
FIG. 2 is a block diagram of an example system for broadcasting multimedia content from a mobile device.

FIG. 2 is a block diagram of an example system 54 for broadcasting multimedia content from a mobile device. The system 54 comprises a processor portion 56, a memory portion 58, and an input/output portion 60. It is emphasized that the block diagram depicted in FIG. 2 is exemplary and not intended to imply a specific implementation. Thus, the system 54 can be implemented in a single processor or multiple processors. Multiple processors can be distributed or centrally located. Multiple processors can communicate wirelessly, via hard wire, or a combination thereof. The system 54 can comprise any appropriate device for providing communication mode information. Examples of appropriate devices include mobile communications devices, mobile telephones, personal digital assistants (PDAs), lap top computers, handheld processors, or a combination thereof.

In various example embodiments, the system 54 can comprise, as described above, the broadcast server 24, the user database 30, or a combination thereof. Accordingly, the system 54 can, in various embodiments, perform the functions associated with the broadcast server 24, the user database 30, or a combination thereof.

In various example embodiments, the input/output portion 60 is capable of receiving and/or providing: a signal indicative of multimedia content (e.g., multimedia content provided by the mobile device 120), a signal indicative of a query for users who should receive the multimedia content, a signal indicative of the connectivity type associated with a user/intended recipient, or a combination thereof, for example.

In various embodiments, the processor portion 56 is capable of: performing broadcast server related functions, performing user database related functions, querying a database; providing a response to a query; determining intended recipients of multimedia content; responding to a request for multimedia content; determining a connectivity type associated with an intended recipient of multimedia content; add subscribers to a list of intended recipients of multimedia content; remove subscribers from a list of intended recipients of multimedia content; modify subscriber information; or a combination thereof, for example.

The memory portion 54 can comprise any appropriate memory portion. In example embodiments, the memory portion 58 can comprise the user database 30 and/or memory associated with the broadcast server 24. In example embodiments, the memory portion 58 is capable of storing information associated with initiating a broadcast of multimedia content from a mobile device. For example, the memory portion 58 is capable of storing information pertaining to intended recipients of multimedia content, information pertaining to the connectivity type associated with an intended recipient of multimedia content, information related to subscriptions of intended recipients, or a combination thereof.

The radio networks, wireless network 22, and/or wireless broadcast network 26 can comprise any appropriate telephony radio network. The following description sets forth some exemplary telephony radio networks, such as the global system for mobile communications (GSM), and non-limiting operating environments. The below-described operating environments should be considered non-exhaustive, however, and thus the below-described network architectures merely show how initiating a broadcast of multimedia content from a mobile device can be incorporated with existing network structures and architectures. It can be appreciated, however, that initiating a broadcast of multimedia content from a mobile device can be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of initiating a broadcast of multimedia via a mobile device can be applied independently of the method of data transport, and do not depend on any particular network architecture, or underlying protocols.

Figure 3:
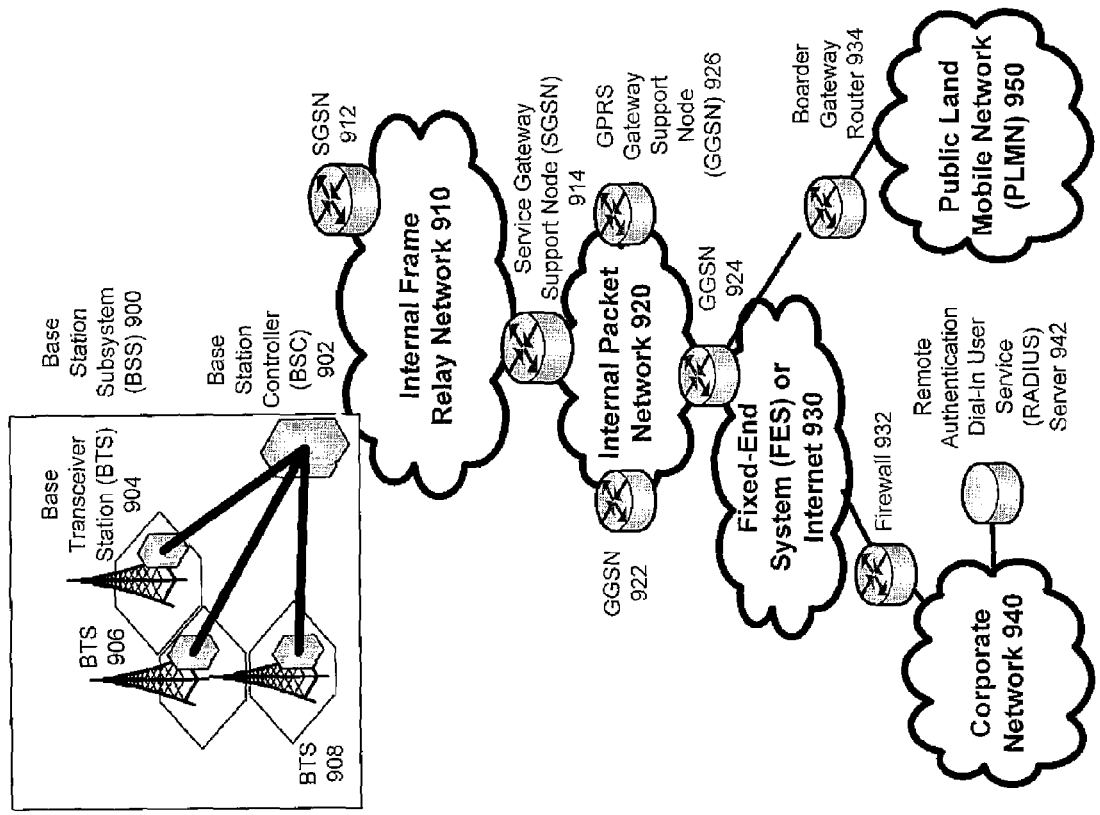
FIG. 3 depicts an overall block diagram of an exemplary packet-based mobile cellular network environment, such as a GPRS network, in which broadcasting multimedia content from a mobile device can be practiced.

FIG. 3 depicts an overall block diagram of an exemplary packet-based mobile cellular network environment, such as a GPRS network, in which broadcasting multimedia content from a mobile device can be practiced. In such an environment, there are a plurality of Base Station Subsystems ("BSS") 900 (only one is shown), each of which comprises a Base Station Controller ("BSC") 902 serving a plurality of Base Transceiver Stations ("BTS") such as BTSs 904, 906, and 908. BTSs 904, 906, 908, etc. are the access points where users of packet-based mobile devices (e.g., mobile device 12) become connected to the wireless network. In exemplary fashion, the packet traffic originating from user devices (e.g., user device 20) is transported via an over-the-air interface to a BTS 908, and from the BTS 908 to the BSC 902. Base station subsystems, such as BSS 900, are a part of internal frame relay network 910 that can include Service GPRS Support Nodes ("SGSN") such as SGSN 912 and 914. Each SGSN is connected to an internal packet network 920 through which a SGSN 912, 914, etc. can route data packets to and from a plurality of gateway GPRS support nodes (GGSN) 922, 924, 926, etc. As illustrated, SGSN 914 and GGSNs 922, 924, and 926 are part of internal packet network 920. Gateway GPRS serving nodes 922, 924 and 926 mainly provide an interface to external Internet Protocol ("IP") networks such as Public Land Mobile Network ("PLMN") 950, corporate intranets 940, or Fixed-End System ("FES") or the public Internet 930. As illustrated, subscriber corporate network 940 may be connected to GGSN 924 via firewall 932; and PLMN 950 is connected to GGSN 924 via boarder gateway router 934. The Remote Authentication Dial-In User Service ("RADIUS") server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 4:
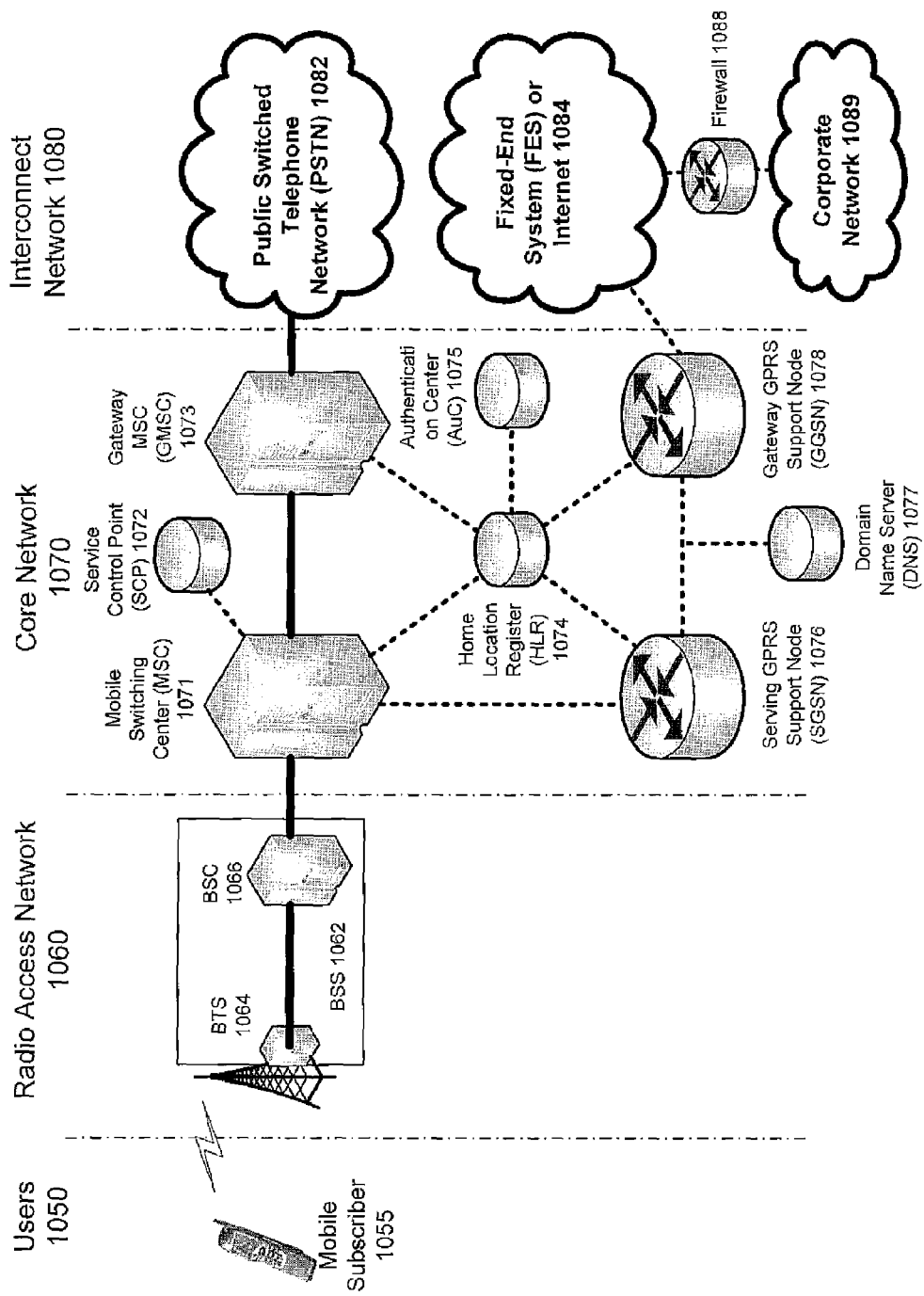
FIG. 4 illustrates an architecture of a typical GPRS network segmented into four groups.

FIG. 4 illustrates an architecture of a typical GPRS network segmented into four groups: users 1050, radio access network 1060, core network 1070, and interconnect network 1080. Users 1050 comprise a plurality of end users (though only mobile subscriber 1055 is shown in FIG. 4). In an example embodiment, the device depicted as mobile subscriber 1055 comprises mobile device 12. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center ("MSC") 1071, Service Control Point ("SCP") 1072, gateway MSC 1073, SGSN 1076, Home Location Register ("HLR") 1074, Authentication Center ("AuC") 1075, Domain Name Server ("DNS") 1077, and GGSN 1078. Interconnect network 1080 also comprises a host of various networks and other network elements. As illustrated in FIG. 4, interconnect network 1080 comprises Public Switched Telephone Network ("PSTN") 1082, Fixed-End System ("FES") or Internet 1084, firewall 1088, and Corporate Network 1089.

A mobile switching center can be connected to a large number of base station controllers. At MSC 1071, for instance, depending on the type of traffic, the traffic may be separated in that voice may be sent to Public Switched Telephone Network ("PSTN") 1082 through Gateway MSC ("GMSC") 1073, and/or data may be sent to SGSN 1076, which then sends the data traffic to GGSN 1078 for further forwarding.

When MSC 1071 receives call traffic, for example, from BSC 1066, it sends a query to a database hosted by SCP 1072. The SCP 1072 processes the request and issues a response to MSC 1071 so that it may continue call processing as appropriate.

The HLR 1074 is a centralized database for users to register to the GPRS network. HLR 1074 stores static information about the subscribers such as the International Mobile Subscriber Identity ("IMSI"), subscribed services, and a key for authenticating the subscriber. HLR 1074 also stores dynamic subscriber information such as the current location of the mobile subscriber. Associated with HLR 1074 is AuC 1075. AuC 1075 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as the mobile device 12, used by an end user of the mobile cellular service. When a mobile subscriber turns on his or her mobile device, the mobile device goes through an attach process by which the mobile device attaches to an SGSN of the GPRS network. In FIG. 4, when mobile subscriber 1055 initiates the attach process by turning on the network capabilities of the mobile device, an attach request is sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 requests more information from mobile subscriber 1055. This information is used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 notifies the old SGSN, to which mobile subscriber 1055 was attached before, to cancel the location process for mobile subscriber 1055. HLR 1074 then notifies SGSN 1076 that the location update has been performed. At this time, SGSN 1076 sends an Attach Accept message to mobile subscriber 1055, which in turn sends an Attach Complete message to SGSN 1076.

After attaching itself with the network, mobile subscriber 1055 then goes through the authentication process. In the authentication process, SGSN 1076 sends the authentication information to HLR 1074, which sends information back to SGSN 1076 based on the user profile that was part of the user's initial setup. The SGSN 1076 then sends a request for authentication and ciphering to mobile subscriber 1055. The mobile subscriber 1055 uses an algorithm to send the user identification (ID) and password to SGSN 1076. The SGSN 1076 uses the same algorithm and compares the result. If a match occurs, SGSN 1076 authenticates mobile subscriber 1055.

Next, the mobile subscriber 1055 establishes a user session with the destination network, corporate network 1089, by going through a Packet Data Protocol ("PDP") activation process. Briefly, in the process, mobile subscriber 1055 requests access to the Access Point Name ("APN"), for example, UPS.com, and SGSN 1076 receives the activation request from mobile subscriber 1055. SGSN 1076 then initiates a Domain Name Service ("DNS") query to learn which GGSN node has access to the UPS.com APN. The DNS query is sent to the DNS server within the core network 1070, such as DNS 1077, which is provisioned to map to one or more GGSN nodes in the core network 1070. Based on the APN, the mapped GGSN 1078 can access the requested corporate network 1089. The SGSN 1076 then sends to GGSN 1078 a Create Packet Data Protocol ("PDP") Context Request message that contains necessary information. The GGSN 1078 sends a Create PDP Context Response message to SGSN 1076, which then sends an Activate PDP Context Accept message to mobile subscriber 1055.

Once activated, data packets of the call made by mobile subscriber 1055 can then go through radio access network 1060, core network 1070, and interconnect network 1080, in a particular fixed-end system or Internet 1084 and firewall 1088, to reach corporate network 1089.

Thus, network elements that can invoke the functionality of initiating a broadcast of multimedia content from a mobile device can include but are not limited to Gateway GPRS Support Node tables, Fixed End System router tables, firewall systems, VPN tunnels, and any number of other network elements as required by the particular digital network.

Figure 5:
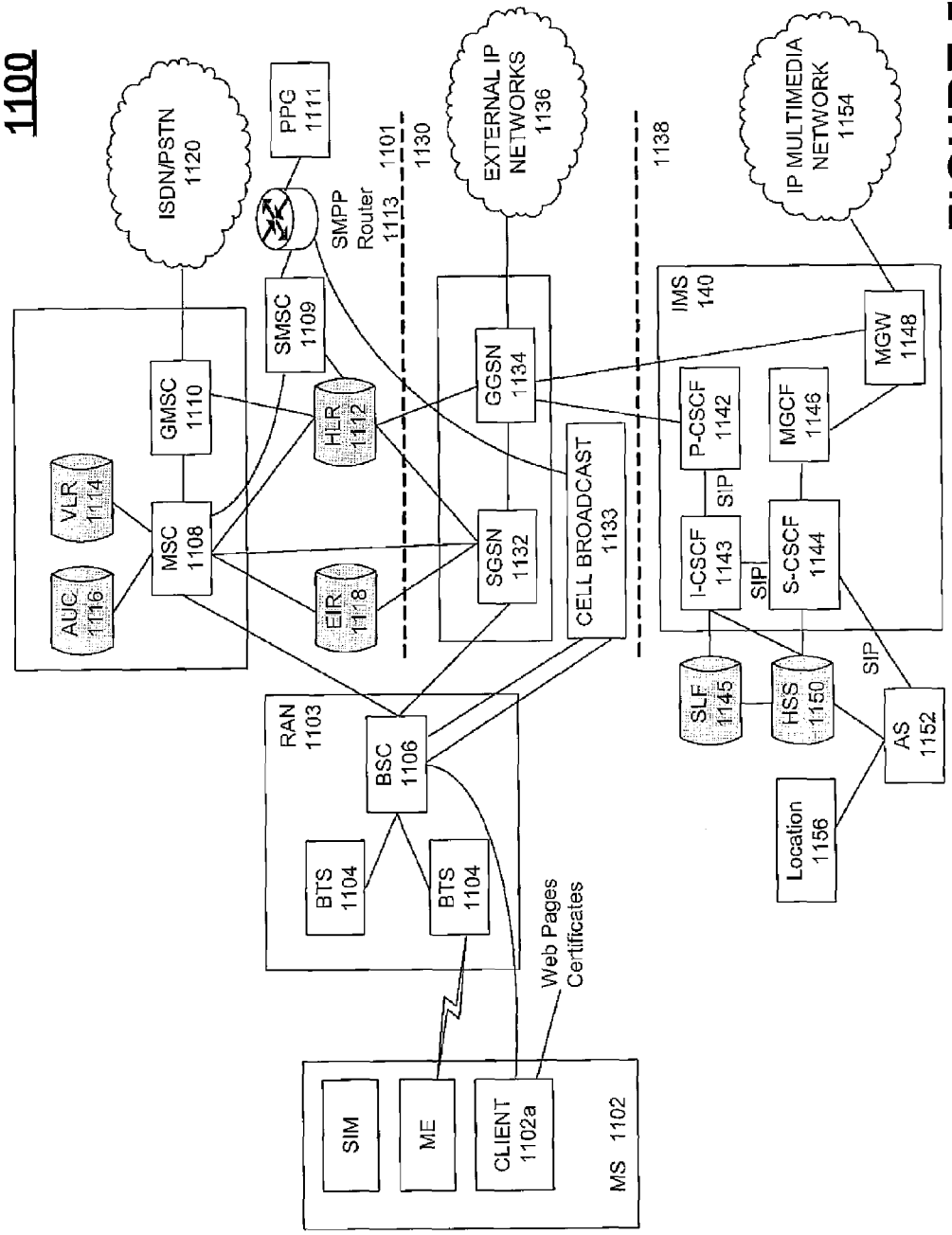
FIG. 5 illustrates another exemplary block diagram view of a GSM/GPRS/IP multimedia network architecture with which broadcasting multimedia content from a mobile device can be incorporated.

FIG. 5 illustrates another exemplary block diagram view of a GSM/GPRS/IP multimedia network architecture 1100 with which broadcasting multimedia content from a mobile device can be incorporated. As illustrated, architecture 1100 of FIG. 5 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile phone or a laptop computer (e.g., mobile device 12) that is used by mobile subscribers, with a Subscriber identity Module (SIM). The SIM includes an International Mobile Subscriber Identity (IMSI), which is a unique identifier of a subscriber. The BTS 1104 is physical equipment, such as a radio tower, that enables a radio interface to communicate with the MS. Each BTS may serve more than one MS. The BSC 1106 manages radio resources, including the BTS. The BSC may be connected to several BTSs. The BSC and BTS components, in combination, are generally referred to as a base station (BSS) or radio access network (RAN) 1103.

The GSM core network 1101 also includes a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 performs a switching function for the network. The MSC also performs other functions, such as registration, authentication, location updating, handovers, and call routing. The GMSC 1110 provides a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 is a database that contains administrative information regarding each subscriber registered in a corresponding GSM network. The HLR 1112 also contains the current location of each MS. The VLR 1114 is a database that contains selected administrative information from the HLR 1112. The VLR contains information necessary for call control and provision of subscribed services for each MS currently located in a geographical area controlled by the VLR.

The HLR 1112 and the VLR 1114, together with the MSC 1108, provide the call routing and roaming capabilities of GSM. The AuC 1116 provides the parameters needed for authentication and encryption functions. Such parameters allow verification of a subscriber's identity. The EIR 1118 stores security-sensitive information about the mobile equipment.

A Short Message Service Center (SMSC) 1109 allows one-to-one Short Message Service (SMS) messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1102 sends a location update including its current location information to the MSC/VLR, via the BTS 1104 and the BSC 1106. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1130 is logically implemented on the GSM core network architecture by introducing two packet-switching network nodes, a serving GPRS support node (SGSN) 1132, a cell broadcast and a Gateway GPRS support node (GGSN) 1134. The SGSN 1132 is at the same hierarchical level as the MSC 1108 in the GSM network. The SGSN controls the connection between the GPRS network and the MS 1102. The SGSN also keeps track of individual MS's locations and security functions and access controls.

A Cell Broadcast Center (CBC) 1133 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1134 provides a gateway between the GPRS network and a public packet network (PDN) or other IP networks 1136. That is, the GGSN provides interworking functionality with external networks, and sets up a logical link to the MS through the SGSN. When packet-switched data leaves the GPRS network, it is transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1130 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 1138 was introduced with 3GPP Release 5, and includes an IP multimedia subsystem (IMS) 1140 to provide rich multimedia services to end users. A representative set of the network entities within the IMS 1140 are a call/session control function (CSCF), a media gateway control function (MGCF) 1146, a media gateway (MGW) 1148, and a master subscriber database, called a home subscriber server (HSS) 1150. The HSS 1150 may be common to the GSM network 1101, the GPRS network 1130 as well as the IP multimedia network 1138.

The IP multimedia system 1140 is built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 forwards session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

The I-CSCF 1143, forms an entrance to a home network and hides the inner topology of the home network from other networks and provides flexibility for selecting an S-CSCF. The I-CSCF 1143 may contact a subscriber location function (SLF) 1145 to determine which HSS 1150 to use for the particular subscriber, if multiple HSS's 1150 are present. The S-CSCF 1144 performs the session control services for the MS 1102. This includes routing originating sessions to external networks and routing terminating sessions to visited networks. The S-CSCF 1144 also decides whether an application server (AS) 1152 is required to receive information on an incoming SIP session request to ensure appropriate service handling. This decision is based on information received from the HSS 1150 (or other sources, such as an application server 1152). The AS 1152 also communicates to a location server 1156 (e.g., a Gateway Mobile Location Center (GMLC)) that provides a position (e.g., latitude/longitude coordinates) of the MS 1102.

The HSS 1150 contains a subscriber profile and keeps track of which core network node is currently handling the subscriber. It also supports subscriber authentication and authorization functions (AAA). In networks with more than one HSS 1150, a subscriber location function provides information on the HSS 1150 that contains the profile of a given subscriber.

The MGCF 1146 provides interworking functionality between SIP session control signaling from the IMS 1140 and ISUP/BICC call control signaling from the external GSTN networks (not shown). It also controls the media gateway (MGW) 1148 that provides user-plane interworking functionality (e.g., converting between AMR- and PCM-coded voice). The MGW 1148 also communicates with other IP multimedia networks 1154.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of broadcasting multimedia content from a mobile device have been described in connection with various computing devices/processor, the underlying concepts can be applied to any computing device, processor, or system capable of broadcasting multimedia content from a mobile device. The various techniques described herein can be implemented in connection with hardware or software or, where appropriate, with a combination of both. Thus, the methods and apparatuses for broadcasting multimedia content from a mobile device, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for broadcasting multimedia content from a mobile device. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for broadcasting multimedia content from a mobile device also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for broadcasting multimedia content from a mobile device. When implemented on a general-purpose processor, the program code combines with the processor to provide a unique apparatus that operates to invoke the functionality of broadcasting multimedia content from a mobile device. Additionally, any storage techniques used in connection with broadcasting multimedia content from a mobile device can invariably be a combination of hardware and software.

While broadcasting multimedia content from a mobile device has been described in connection with the various embodiments of the various figures, it is to be understood that other similar embodiments can be used or modifications and additions can be made to the described embodiment for performing the same function of broadcasting multimedia content from a mobile device without deviating therefrom. For example, one skilled in the art will recognize that broadcasting multimedia content from a mobile device as described in the present application may apply to any environment, whether wired or wireless, and may be applied to any number of such devices connected via a communications network and interacting across the network. Therefore, broadcasting multimedia content from a mobile device should not be limited to any single embodiment, but rather should be construed in breadth and scope in accordance with the appended claims.

What is claimed:

1. A method for broadcasting multimedia content from a mobile device, the method comprising:
   providing the multimedia content from the mobile device;
   providing a query for intended recipients of the multimedia content and connectivity types identified by each respective intended recipient, each respective intended recipient having subscribed to receive the multimedia content, and the connectivity types including at least one of a wireless broadcast network, an intranet, or an internet;
   determining at least one intended recipient to which the multimedia content is to be broadcast based on a reply to the query, the at least one intended recipient being determined by the mobile device;
   determining at least one connectivity type identified by the at least one determined intended recipient based on the reply to the query, the identified at least one connectivity type being designated by the at least one determined intended recipient via which to receive the multimedia content; and
   broadcasting the multimedia content to the at least one determined intended recipient via at least one of the wireless broadcast network or an Internet Protocol (IP) data session.

2. A method in accordance with claim 1, wherein the multimedia content is received by the mobile device via at least one of a download or a personal area network.

3. A method in accordance with claim 1, further comprising generating, by the mobile device, the multimedia content.

4. A method in accordance with claim 1, wherein the multimedia content comprises at least one of graphic content, video content, audio content, or sensor content.

5. A method in accordance with claim 1, wherein the mobile device comprises at least one of a portable media player, a portable music player, a portable computing device, a personal digital assistant, a portable phone, a portable email device, a thin client, a portable gaming device, a public computing device, a navigation device, a non-conventional computing device, a smart phone, a Session Initiation Protocol (SIP) phone, or a video phone.

6. A system for broadcasting multimedia content from a mobile device, the system comprising:
   an input/output portion configured to:
      receive multimedia content from a mobile device; and
      broadcast the multimedia content to at least one intended recipient via at least one connectivity type identified by each respective intended recipient, each respective intended recipient having subscribed to receive the multimedia content, and the identified at least one connectivity type being designated by the at least one intended recipient via which to receive the multimedia content; and
   a processor portion configured to:

query a memory portion for intended recipients and connectivity types identified by each respective intended recipient;

determine the at least one intended recipient to which the multimedia content is to be broadcast based on a reply to the query; and determine the at least one connectivity type identified by the at least one determined intended recipient based on the reply to the query; and the memory portion configured to:

store an indication of the at least one determined intended recipient and the at least one determined connectivity type.

7. A system in accordance with claim 6, wherein the memory portion comprises a database.

8. A system in accordance with claim 6, wherein the multimedia content comprises at least one of graphic content, video content, audio content, or sensor content.

9. A system in accordance with claim 6, wherein the connectivity type comprises at least one of a wireless broadcast network, an intranet, or an internet.

10. A system in accordance with claim 6, the input/output portion further configured to broadcast the multimedia content via a wireless broadcast network.

11. A system in accordance with claim 6, the input/output portion further configured to broadcast the multimedia content via an Internet Protocol (IP) data session.

12. A computer-readable storage medium comprising computer-executable instructions for broadcasting multimedia content from a mobile device, the computer-executable instructions when executed by a computing device causing the computing device to execute the computer-executable instructions, including:

providing from the mobile device the multimedia content comprising at least one of graphic content, video content, audio content, and sensor content;

providing a query for intended recipients of the multimedia content and connectivity types identified by each respective intended recipient, each respective intended recipient having subscribed to receive the multimedia content, and the connectivity types including at least one of a wireless broadcast network, an intranet, or an internet;

determining at least one intended recipient to which the multimedia content is to be broadcast based on a reply to the query, the at least one intended recipient being determined by the mobile device;

determining at least one connectivity type identified by the at least one determined intended recipient based on the reply to the query, the identified at least one connectivity type being designated by the at least one determined intended recipient via which to receive the multimedia content; and broadcasting the multimedia content to the at least one determined intended recipient via at least one of the wireless broadcast network or an Internet Protocol (IP) data session.

\* \* \* \* \*